United States Patent [19]
Williams

[11] 3,907,117
[45] Sept. 23, 1975

[54] CART FOR LIDDED CANS

[76] Inventor: Robert J. Williams, 316 31st Ave., Seattle, Wash. 98122

[22] Filed: Nov. 29, 1973

[21] Appl. No.: 419,953

[52] U.S. Cl. .................. 211/71; 211/7; 248/129; 248/154; 248/DIG. 7; 280/79.2; 280/179 R
[51] Int. Cl. ........................................... A47g 29/00
[58] Field of Search ............ 211/71, 83, 84, 7, 8; 248/154, 147, DIG. 7, 129; 280/179 R, 47.19, 79.2

[56] References Cited
UNITED STATES PATENTS

| | | | |
|---|---|---|---|
| 2,750,140 | 6/1956 | Smith | 248/154 |
| 2,855,217 | 10/1958 | Bagwell | 280/179 R |
| 3,065,858 | 11/1962 | Furr | 248/DIG. 7 UX |
| 3,749,414 | 7/1973 | Lynn | 211/83 X |
| R27,437 | 7/1972 | Bailey | 280/47.19 |

FOREIGN PATENTS OR APPLICATIONS

| | | | |
|---|---|---|---|
| 861,529 | 1/1953 | Germany | 211/71 |
| 627,876 | 9/1961 | Canada | 211/71 |

*Primary Examiner*—Marion Parsons, Jr.
*Assistant Examiner*—Rodney H. Bonck

[57] ABSTRACT

An elongated wheeled rack or cart is provided with means to support a plurality of containers such as garbage cans and the like. Upright members at the ends of the rack support a generally U-pivoted hold down bar for container lids. The hold down bar is manually lifted to permit intentional access to the containers.

3 Claims, 3 Drawing Figures

US Patent  Sept. 23,1975  3,907,117

CART FOR LIDDED CANS

SUMMARY OF THE INVENTION a. Field of the Invention

This invention is particularly useful for dwellers in large residences or apartments where numerous waste disposal cans are required to be racked and easily moved to waste collection points.

b. Prior Developments

Mobile racks for garbage or trash cans are known and are typified by the disclosures of the Black U.S. Pat. No. 3,276,600 and Chappell U.S. Pat. No. 3,292,795. There remains a need for means to hold down the lids of several rack cans to prevent their unintentional displacement as by the wind or by animals, such as dogs. The lid-securing means known to me appear to be individual or single and often comprise chains or arms attached to the rack, such as Black and Chappell (supra) or as seen in the McKee U.S. Pat. No. 3,214,120 or Hall U.S. Pat. No. 3,235,213.

The primary object of this invention has been the provision of a lid hold-down means operable with numerous containers; easily manually manipulated to provide access to all the containers; and which means is simple, rugged, effective and easily constructed and maintained.

Figure 1:
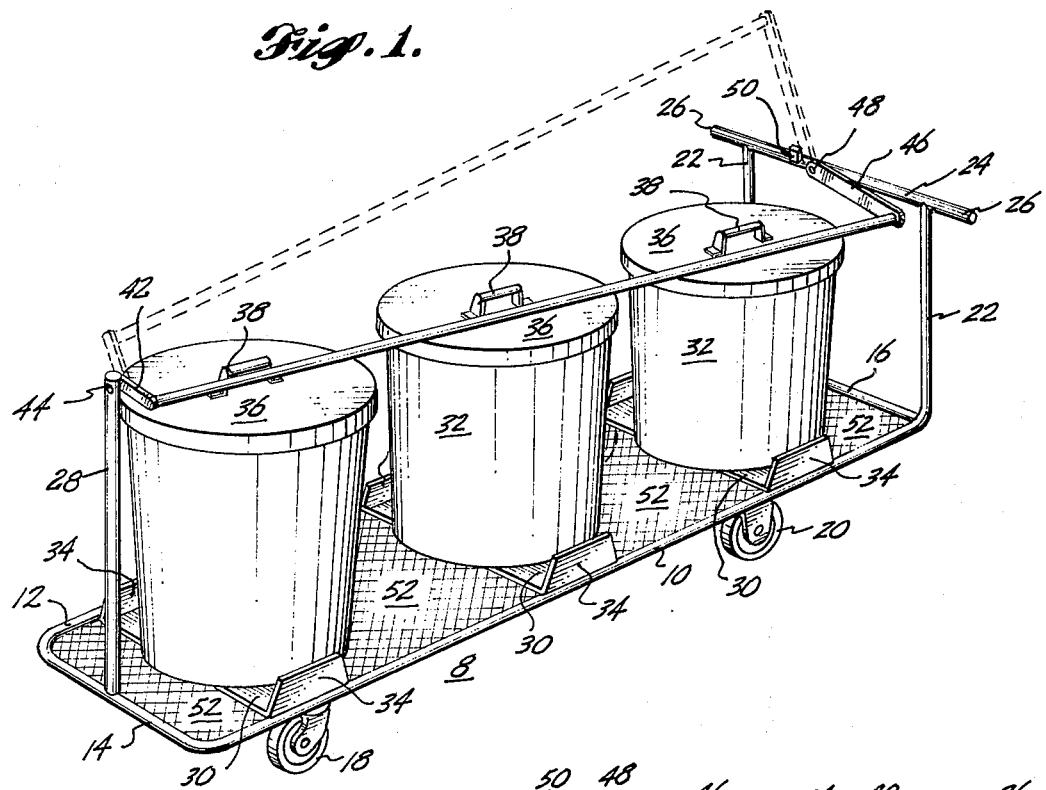
FIG. 1 is a perspective view of the mobile rack for garbage cans of this invention.
Figure 2:
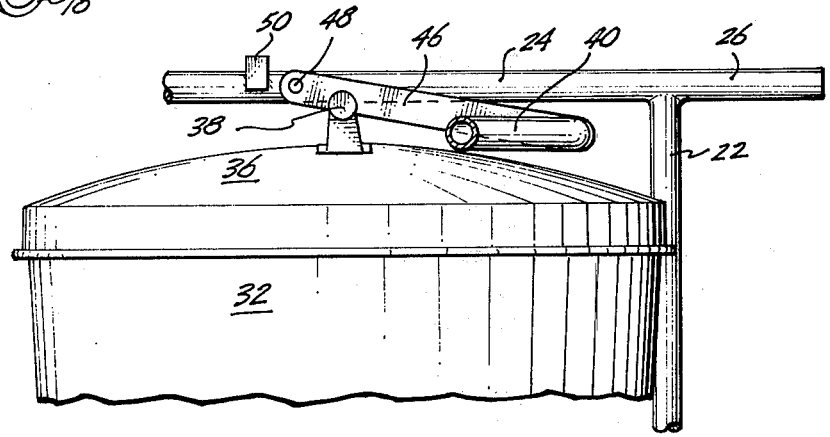
FIG. 2 is an enlarged fragmentary detail of a lid hold-down employed in this mobile rack.

DESCRIPTION OF THE INVENTION:

The mobile rack, frame 8, preferably formed of elongated tubular members appropriately welded together, is generally rectangular in plan view and comprises side members 10,12 and end members 14,16. Wheels 18 and 20 support the frame above the ground. Wheels 18 may be caster-mounted to facilitate steering.

At one end of frame 8 there are risers 22,22 joined at their upper ends by cross-bar 24, the ends of which protrude to form handles 26,26. Risers 22 and bar 24 comprise an arch frame, transverse frame 8.

At the opposite end of frame 8 is a single, standard or post 28 rising to a height substantially conextensive with the height of risers 22.

Plates 30 span between side members 10,12 and form laterally disposed supports for containers 32. The upstanding lips 34 at the ends of plates 30 confine the bottoms of cans 32 to prevent unintentional displacement.

Each of the cans 32 has the usual lids 36 commonly provided with a handle 38.

Extending between the upper end of post 28 and the arch frame is an elongated can-lid hold down bar 40 which at one end has rigid arm or link 42 secured to post 28 by pivot 44, and arm or link 46 at the other end secured medially to bar 24 of arch frame by pivot 48. Stop means to maintain the hold down bar in the upper inoperable position shown in FIG. 3 may comprise the lug 50 instanding from bar 24.

Arm 46 is preferably longer than arm 42. As a result, assuming pivots 44 and 48 are on the same axis, bar 40 lies obliquely relative to the longitudinal axis of the rack frame.

The spaces within frame 8 between the sides and between plates 30,30 are preferably spanned by screen mesh 52 which serves to prevent waste material falling to the ground but also serves to keep cans 32 from tipping as the rack is moved over rough ground surfaces.

The weight of the can-lid hold down bar 40 is such that dogs or other animals cannot nose the lids 36 off cans 32. Yet, by reason of the end pivot connections, bar 40 is easily raised to permit lid displacement while waste is being deposited in a can 32.

Figure 3:
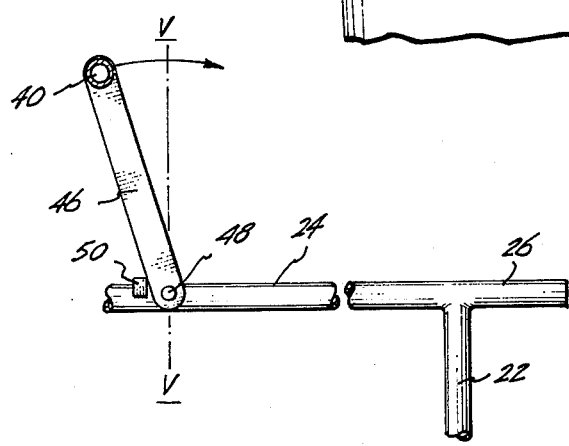
FIG. 3 is an enlarged fragmentary view showing the lid hold-down in inoperable position.

Bar 40 stands out of the way when raised to a position where arm 46 stands to the rear of the vertical as represented by line V—V in FIG. 3. The oblique disposition of bar 40 accommodates cans of varying diameters.

It will be seen that a person may easily move and transport a plurality of garbage cans as a unit with the mobile cart disclosed herein. Handles 26 permit easy steering means and pressure thereon will permit the end 14 to raise and thus lighten the load on wheels 18.

In compliance with the statute, the invention has been described in language more or less specific as to structural features. It is to be understood, however, that the invention is not limited to the specific features shown, since the means and constrution herein disclosed comprises a preferred form of putting the invention into effect. The invention is, therefore, claimed in any of its forms or modifications within the legitimate and valid scope of the appended claims, appropriately interpreted in accordance with the doctrine of equivalents.

What is claimed is:

1. A mobile rack for garbage cans and like containers having loose-fitting lids, comprising:
   an elongated, wheeled cart-frame adapted to transport a plurality of containers;
   an upright post medially located at one end of said cart frame;
   transverse the other end of said cart-frame an upright arch frame;
   said cart-frame including means between said post and said arch-frame to support said plurality of containers in a row substantially centered longitudinally of said post;
   an elongated U-shaped hold-down extending between said post and said arch frame, and comprising a bar normally disposed in overlying relation to the lids of garbage cans supported on said cart; and
   said hold-down also comprising an arm on each end of said bar, one of said arms being pivotally connected to said post and the other of said arms being pivotally connected to said arch-frame whereby said bar may be swung in an arc about the axis established by said pivotal connections of said arms, one of said arms on said bar being longer than the other said arm.

2. The structure of claim 1 in which the longer arm is pivotally associated with said arch frame.

3. The structure of claim 1 in which the arch frame includes stop means located to be engaged by the arm pivotally connected to said arch frame when the U-shaped hold-down has been swung up and over its pivotal axis.

* * * * *